April 26, 1955      R. E. STOUT      2,706,851
METHOD FOR SPIRALLY CONSTRUCTING BUILDINGS
Filed Sept. 26, 1950      5 Sheets-Sheet 1
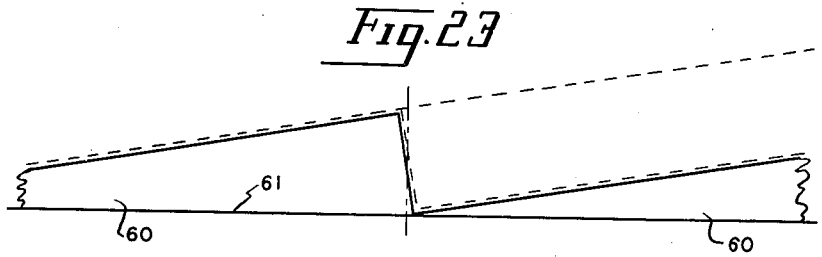
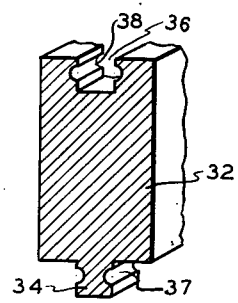
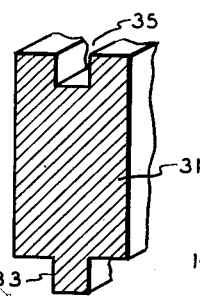
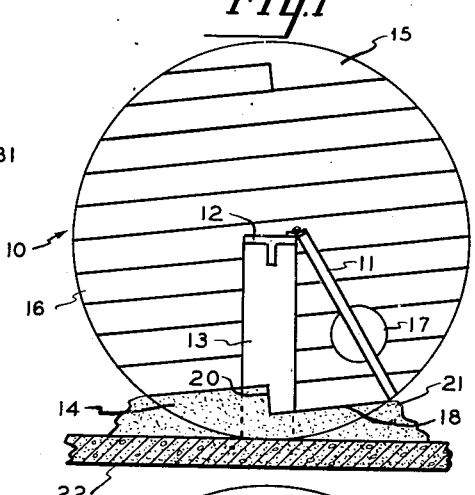
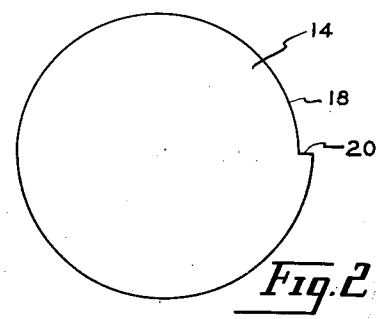
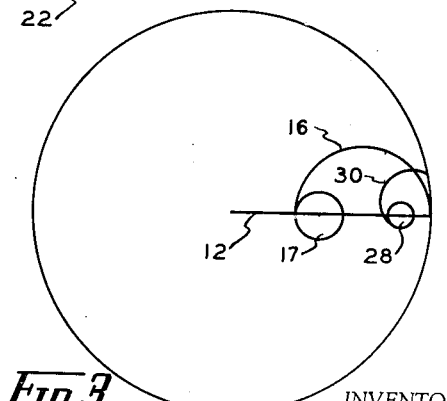
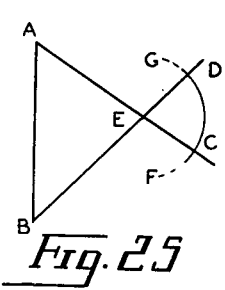
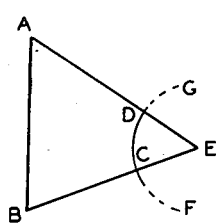
INVENTOR
RICHARD ELWOOD STOUT
BY *Gustave Miller*
ATTORNEY April 26, 1955   R. E. STOUT   2,706,851
METHOD FOR SPIRALLY CONSTRUCTING BUILDINGS
Filed Sept. 26, 1950   5 Sheets-Sheet 2

INVENTOR
RICHARD ELWOOD STOUT

BY *Gustave Miller*
ATTORNEY

April 26, 1955 R. E. STOUT 2,706,851
METHOD FOR SPIRALLY CONSTRUCTING BUILDINGS
Filed Sept. 26, 1950 5 Sheets-Sheet 3

INVENTOR
RICHARD ELWOOD STOUT

BY Gustave Miller
ATTORNEY

April 26, 1955    R. E. STOUT    2,706,851
METHOD FOR SPIRALLY CONSTRUCTING BUILDINGS
Filed Sept. 26, 1950    5 Sheets-Sheet 4

INVENTOR
RICHARD ELWOOD STOUT
BY Gustave Miller
ATTORNEY

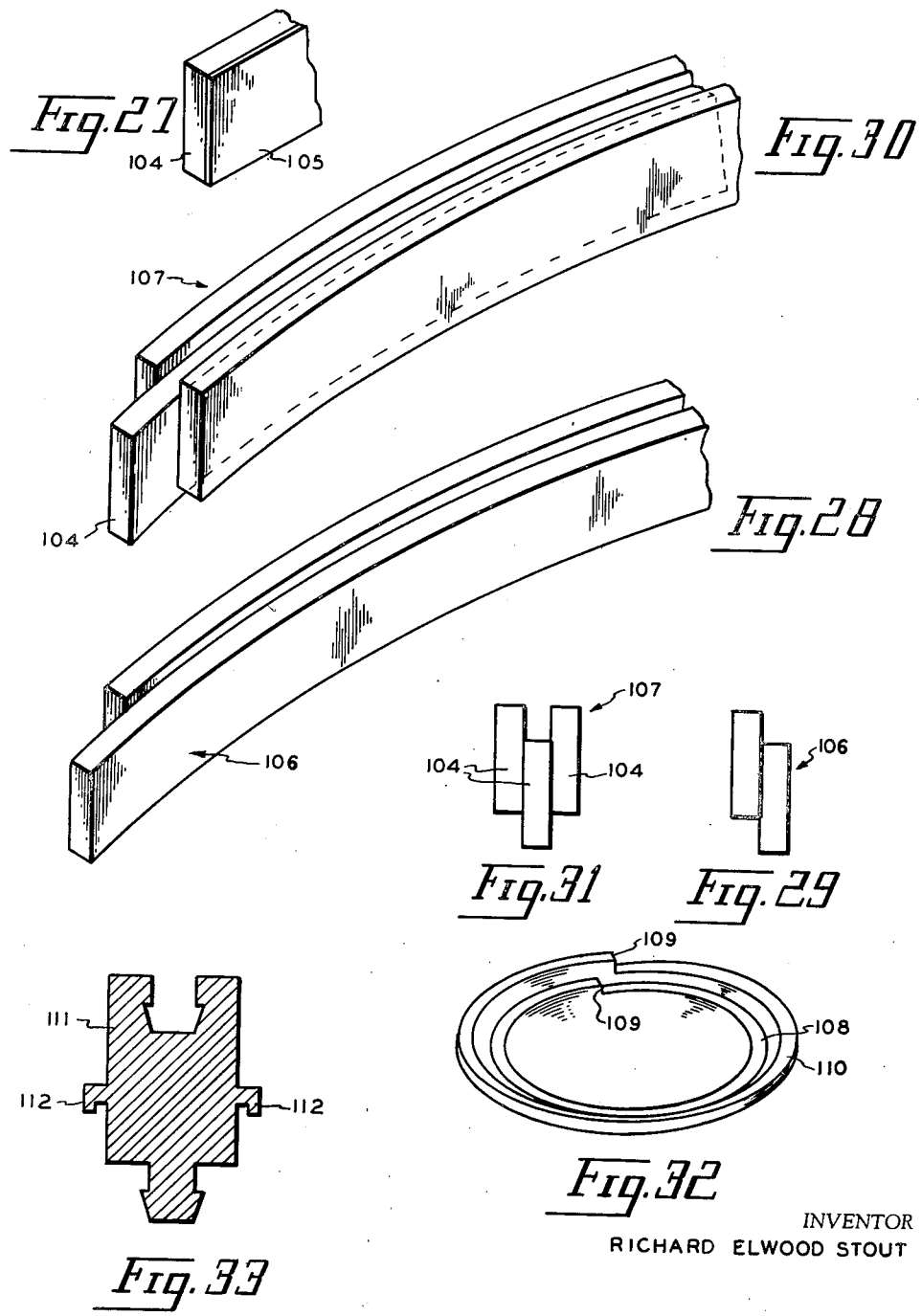

United States Patent Office 2,706,851
Patented Apr. 26, 1955

2,706,851
METHOD FOR SPIRALLY CONSTRUCTING BUILDINGS

Richard E. Stout, New York, N. Y.

Application September 26, 1950, Serial No. 186,884

2 Claims. (Cl. 29—456)

This invention relates to a method and to an apparatus for an automatic spiral construction of tanks and other buildings and has for an object to provide a method of automatically and spirally constructing tanks and other buildings such as spherical or cylindrical containers of large size as well as spherical and cylindrical buildings and tanks and buildings of other shapes wherein curves are a necessary part of the shape of the tank or the building.

A further object of this invention is to provide a method of making a tank or other structure whose walls consist principally of a spirally extending member joined at its top and bottom to succeeding coils of itself.

A further object of this invention is to provide a method for automatically spiralling a strip of continuously extending building material and forming a closed structure thereby and simultaneously securing the lower edge of each succeeding coil to the upper edge of each preceding coil thereof.

A further object of this invention is to provide a method for automatically spirally constructing a piece of continuous building material into a building structure and for automatically electrically welding or soldering or otherwise securing the lower edge of each succeeding coil of the building material to the upper edge of the preceding coil of the building material.

A further object of this invention is to provide an improved type of building material capable of being wound on spools for cooperation with the automatic radius beam apparatus of this invention and provided at its top and bottom edges with means for cooperating with the top edge of preceding coil and the bottom edge of a succeeding coil in forming a structure.

A further object of this invention is to provide an improved type of building material and method of making the same during construction of the building, wherein the elements of the improved type of building material strip include either two or three individual substantially identical strips of plain rectangular cross section, each strip being wound on an individual spool for cooperation with the automatic radius beam of this invention, the two or three strips being fed simultaneously in staggered or off-set relationship to each other, and simultaneously bonded or joined together, as by soldering or spot-welding, so that they act as a single strip with off-set top and bottom edges so far as supporting succeeding convolutions are concerned, and, being only one-half or one-third of the completed joined strip, are easier to flex and place in position, and, further, the inner individual strip being located with a smaller radius than the next outer strip to which it is joined, will be under a tendency to make the completed strip tend to retain its curved shape, rather than tending to straighten out, as with a single curved strip of twice or thrice the thickness. A further feature of making the wall of such individual strips is that a sharper curvature can be followed, if necessary, than could be done with a strip of twice or thrice the thickness, yet the finished wall is made of a completed strip of such twice or thrice thickness, but with the advantage of being set with a tendency to remain curved, rather than to straighten out, and thus providing a lap joint, in the case of a double strip, and a tongue and groove joint, in the case of a triple formed strip, without the expense of cutting lap or tongue and groove edges in the building strip.

A further object of this invention is to provide individual strips which are dipped in molten solder which is allowed to harden in a thin plate thereon, so that when the strips are positioned to form a multiple strip in location, heat simultaneously applied will sweat the strips together into a multiple thickness strip of substantial strength, and if only temporary construction is desired, subsequent heating will permit ready disassembly thereof.

A further object of this invention is to provide base and roof caps or plates and an improved method of making such by dishing and securing together two or three individual thin plates, previously cut to the right shape and size, including a right-angle off-set of the proper height corresponding to the height of the building strip, thus eliminating the need for providing the building strip with a separate bevelled beginning and end portion.

A further object of this invention is to provide a method for automatically spiralling a continuous strip of building material into a temporary structure and for thereafter automatically de-spiralling the temporary structure back into a continuous strip for reuse in a subsequent temporary structure, thus salvaging the great majority of the building material.

A further object of this invention is to provide a method for automatically spiralling a continuous strip of building material into a building structure which building structure may be either temporary or permanent and wherein the spirally wound building material may provide building structure per se or may provide a temporary or permanent framework or mold within which or about which a plastic or concrete shell may be formed or may provide a permanent skeleton which may have a plastic or concrete shell completely embedding the same, both internally and externally.

A further object of this invention is to provide a method for automatically spirally constructing a hollow-walled tank or other building by means of an improved radius beam apparatus and thereafter converting the hollow-walled building into a solid-wall building by pouring a plastic or concrete material therewithin, such pouring being done either as the hollow walls are in the process of construction or after the hollow walls have been substantially completed.

A further object of this invention is to provide a method for spirally constructing a spherical or cylindrical tank wherein the principal vertical area of the tank is formed by a spirally placed continuous strip of building material and wherein the top and bottom area are formed of suitably cooperating bases and caps.

A further object of this invention is to provide means and apparatus for automatically spirally constructing a structure utilizing a continuous strip of building material of any suitable material such as metal, preformed plastics, or even wood strips such as plywood or the like, which may be formed in long, continuous strips properly shaped.

A further object of this invention is to provide an improved cooperating joint in various shapes whereby the continuous strip of building material may have its lower edge of a succeeding coil automatically and permanently or temporarily secured to the upper edge of a preceding coil.

A further object of this invention is to provide trussing means for the building construction according to this invention which trussing means will be located between suitably positioned discontinuities of the continuous building strip and joined to such succeeding discontinuities in a manner similar to the manner that the edges of the building strip are joined upon itself.

A further object of this invention is to provide trussing means made of two or three individual off-set or staggered plates welded or sweated together in location to form a completed truss, in the same manner as three off-set or staggered strips are sweated together to make the finished building strip in location.

A further object of this invention is to provide the outer surfaces of the building strip, whether of the lap joint or tongue-and-groove form, or the multiple individual formed in location strip form, with outwardly protruding projecting tracks, both for the welding head for gripping the preceding coil tightly in doing mash welding, and for subsequent cooperation with maintenance equipment such as paint spray equipment traveling thereon.

With the foregoing and other objects in view, this invention comprises the method, combination, construction and arrangement of parts hereinafter set forth, claimed and disclosed in the accompanying drawings, wherein:

Fig. 1 schematically shows the method and apparatus for building a spherical tank according to this invention;

Fig. 2 is a plan view of a top or bottom cap for the tank of Fig. 1;

Fig. 3 is a schematic view of the radius beam and its accessories in operative position;

Fig. 4 is a sectional fragmentary perspective sectional view of a piece of building strip;

Fig. 5 is a similar perspective sectional view of a different form of building strip;

Fig. 23 shows a starting strip fabricated to establish the desired angle of the spiral;

Figs. 25 and 26 are schematic patterns showing how the siding of a tank may be varied in diameter and shape.

Fig. 27 shows an individual strip, with a plate of solder thereon, for use in making a multiple thickness strip on location;

Fig. 28 shows a two thickness completed strip;

Fig. 29 is an end view of Fig. 28;

Fig. 30 shows a three thickness completed strip;

Fig. 31 is an end view of Fig. 30;

Fig. 32 is a perspective view of a two thickness base or roof cap, and

Fig. 33 is a sectional view of a strip having projecting tracks on the outer surfaces thereof.

Figure 24:
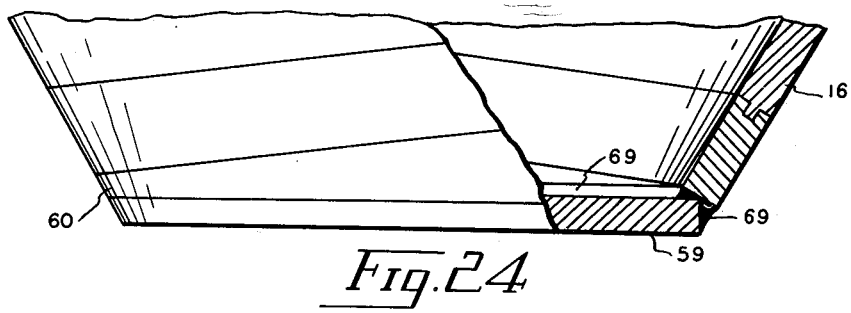
Fig. 24 is a detail view partly in section showing the joining of the starting strip to a base plate and the joining of the building strip thereon.

There is shown at 10 a schematic representation of a spherical tank built according to the method of this invention. In building this spherical tank 10, use is made of a radius beam 11 hinged to a pivot 12 which in turn is mounted for rotation on a vertical support or pivot bar 13, the pivot 12 being located at the center point of the tank 10. The tank 10 consists of a bottom cap 14 and a top cap 15, both more or less identical, and a spirally wound strip or strake 16 which extends from the bottom cap 14 to the top cap 15. The strip or strake 16 is wound on a reel 17 mounted on the radius beam 11 and is fed into position from the reel 17 by the rotation of the radius beam 11 about its pivot 12 in a continuously ascending spiral, the lower edge of the strip being initially supported on the edge 18 of the cap 14 starting at the point 20 and then after the first revolution is completed about the edge 18 and the cap 14, the lower edge of the strip is supported on the upper edge of the previously wound portion thereof, the spherical form being provided automatically by the radius beam 11 hinging upwardly about the pivot 12 on the central support or pivot bar 13.

Figure 16:
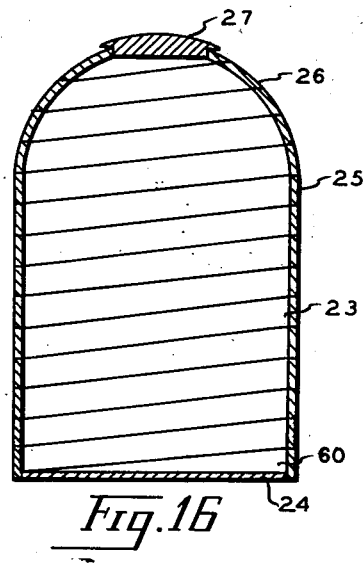
Fig. 16 is a transverse vertical section through a cylindrical tank made according to this invention.

When the strip has reached as high a point as it is practical to go within the limits of flexibility, it is terminated. The radius beam 11, its pivot 12, the support 13, and the apparatus and material carried by the radius beam may then be removed and the cap 15 placed in position thereon. The essence of the invention resides in that the radius beam automatically feeds the continuous siding strip 16 in a spiral supported on itself to form the outside of a tank, here shown as spherical and shown in Fig. 16 as being a combination of a cylindrical lower portion and a semi-spherical upper portion, in contrast to the conventional manner of building such tanks by a patchwork manual process.

In Fig. 1 the cap 14 may rest on an earth or concrete base 21 which in turn may rest on a concrete slab 22 thus providing proper stability for the finished tank. In the cylindrical tank shown in Fig. 16, the siding strip 23 is spiralled about the edge of a bottom cap 24 and rises in a continuous spiral by means of a horizontal radius beam rising continuously about a temporarily centrally located vertical rod until the top of the desired cylindrical area is reached at approximately 25 whereupon the radius beam ceases to rise horizontally and instead starts to hinge upwardly in the same manner as in Fig. 1 to provide a semi-spherical portion 26 until its limit of flexibility is reached whereupon the apparatus is removed and the top cap 27 is manually put in position.

There has thus been disclosed the broad basic concept of this invention, but the details of the method and the details of the apparatus used in carrying out the method may be varied within very great limits. The siding strip 16 may have varied forms and may be of varied materials. Its edges may be self-locking by themselves or additional means may be provided and usually will be provided for automatically securing or bonding the bottom of an upper portion of the spiral strip, either temporarily or permanently, to the top of the lower portion of the spiral strip. This has been shown schematically in Fig. 3, where the spiral siding strip may be of metal and a reel 28 of welding or soldering material 30 is automatically fed onto the edges of the strip 16 together with soldering or welding apparatus mounted on the radius beam 11 for automatically securing the contacting edges of the spiral strip together.

Several forms of spiral strip are illustrated in Figs. 4–8, inclusive, and many other forms are easily conceivable. In Figs. 4 and 5, the spiral strips 31 and 32 are of metal and provided with tongues 33 and 34 on their lower edges arranged to be secured in the grooves 35 and 36 on their upper edges. In Fig. 4 the tongue 33 and groove 35 are substantially complementary and interfit together and may be secured together by seam welding, spot welding or soldering. Where bonded by seam or spot welding, the electrodes would fuse the metal through the united tongue and groove along a line about half way the depth of the tongue and groove.

In Fig. 5, the side walls of the tongue 34 are provided with a pair of semi-circular mating channels 37 and the side walls of the groove 36 are provided with similar mating channels 38 wherein solidified solder will form a barrier to resist the disengagement of the tongue 34 and groove 36. The solder 30 will be fed into the groove 36 automatically and in an amount just sufficient to fill the channels provided by the semi-channels 37 and 38. It will be liquified by a suitable torch or electrical heating apparatus carried by the radius beam 11, just as the tongue is about to enter the groove, so that the liquified solder may flow into the channel and solidify and form an interlock. Obviously, the width of the tongue 34 may be very slightly less at its tip than the width of the base of the groove 36 so as to permit the liquified solder to reach the channels more readily.

Figure 6:
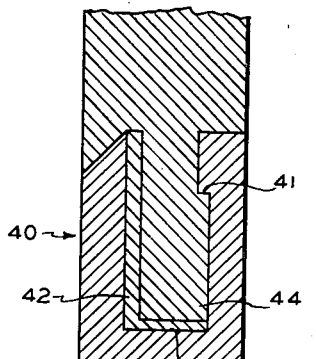
Fig. 6 is a sectional view of an inter-locking joint of another form of metal building strip.

In Fig. 6 a different form of interlocking tongue and groove is provided for the strip 40. In the previously shown forms, the tongue 33 and groove 35 have no interlock to resist disengagement of the tongue and groove. In the strip 32 of Fig. 5 only the solidified solder resists rupture or separation, but in the form shown in Fig. 6, the metal of the siding strip itself is locked together at the point 41 unless the solder 42 and 43 is re-melted or the siding metal or strip itself is ruptured or split. In this form the upper portion of the strip is provided with an offset at 41 in one sidewall and the tongue 44 is provided with a corresponding offset. The maximum width of the tongue however is equal to or slightly less than the minimum width of the groove and the depth of the tongue is somewhat less than the depth of the groove. As a result, when the proper amount of solder 30 is deposited in the groove of this strip 40 and then liquified just before the tongue 44 is inserted into the groove, the bottom of the tongue 44 will cause some of the liquified solder to flow into the space at the side between the tongue and groove and as the strip is aligned on itself the offset in the tongue will be forced under the offset in the groove and the liquified solder will solidify at 42 and 43 whereby the tongue 44 will be held in interlocking relation at the offset 41.

Figure 7:
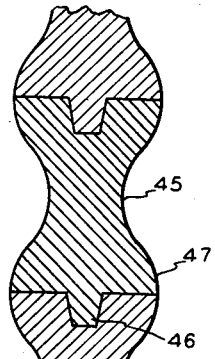
Fig. 7 shows still another joint for metal strips.

In Fig. 7 the strip is shown as being an extruded fabric strip which approximates homogeneous strength throughout the surface of the tank. By this is meant that by making the tongue and groove area 46 in a bulbous form 47, the enlarged width of that area, as compared to the narrow mid-section 45 of the fabric strip's cross-section, tends to compensate for the weakness inherent in a soldered or otherwise bonded joint.

Figure 8:
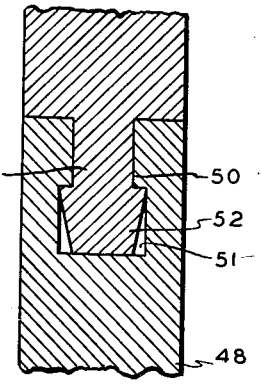
Fig. 8 shows yet another form of interlocking strip, particularly where the strip may be of metal or of fabricated cellulosic material.
Figure 9:
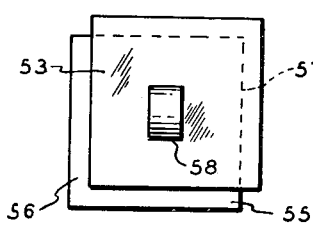
Fig. 9 is a plan view of a truss lug.
Figure 10:
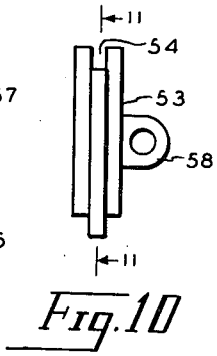
Fig. 10 is a side view of Fig. 9.
Figure 11:
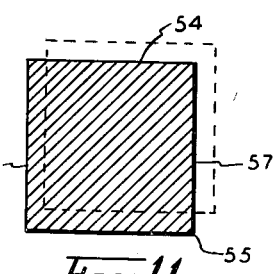
Fig. 11 is a sectional view on line 11—11 of Fig. 10.
Figure 12:
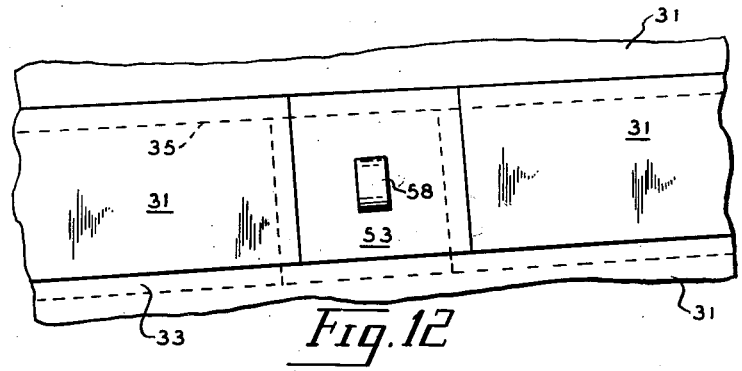
Fig. 12 is an elevation of the truss lug in operative use.
Figure 15:
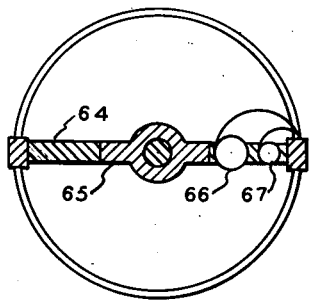
Fig. 15 is a top plan partly sectional view of the rotating diameter beam in position with the strip roll and soldering or welding tool schematically indicated.

In Fig. 8 there is shown a style of strip 48 considered practical in the assembly of spirally erected structures from milled wood and material. Here the interlock is provided by simply forcing the counterboard walls 50 of the channel 51 sufficiently apart to allow the enlarged head 52 of the tongue 49 to snap into permanent position, thus positively interlocking the succeeding convolutions. It is herein assumed that the material is to be glued together, the supply of glue being fed into the groove 51 from the end of a radius beam just before the tongue is inserted into the groove. Such assembly is of course not designed for disassembly; the structure formed therefrom would have to be permanent.

In connection with the use of an interlocking tongue and groove, it would not usually be necessary that the solder be perfectly bonded to the metal strip throughout the tongue and groove intersection. It would often be sufficient if the solder merely occupied the area shown at 42, while the area 43 could be omitted with the tongue of substantially the same depth as the groove and the interlocked offset in position, thereby making the seam leakproof and retaining the metal interlock along the line of the offset 41. It will thus be seen that the metal strip may be made of metal, wood, or extruded or other plastic material, and may have many different types or forms of inter-engagement whether interlocked or not between the upper surface of a preceding convolution and the lower surface of the first succeeding convolution.

In many cases it may be desirable to reinforce the tank either internally or externally by means of trusses, external leg supports, or other reinforcing methods. In such cases lugs such as shown at 53 in Figs. 9–12, inclusive, for the attachment of such reinforcing means, would be introduced between intersecting ends of adjoining metal strips. If necessary the siding strip 16 would be cut at any desired location in order to introduce a truss lug 53 therein at the desired spot. Such lugs 53 would be properly grooved and flanged to fit into the tongue and groove pattern being used. The lug 53 is shown to fit the pattern of the tongue 33 and groove 35 of the strip 31 shown in Fig. 4. This lug 53 is provided with a top groove 54 and bottom tongue 55 and, in addition, is provided with a front tongue 56 and a rear groove 57, while one face thereof has an integrally projected truss eye 58. Obviously, the opposite face could have a similar truss eye if desired.

The end of each strip will be provided with a groove similar to the groove on the top edge thereof, which groove will cooperate with the tongue 56 while the beginning of a strip will have a tongue corresponding with the tongue on the bottom of the strip, and thus cooperate with the groove 57. In the example shown, the lug 53 has tongues and grooves corresponding to the tongues 33 and grooves 35 of the strip 31 shown in Fig. 4, and it will be apparent that the tongues and grooves of the lug may correspond to the tongue and groove of other forms of strip. If necessary to cut the strip at any spot in order to place a truss lug therein, it will be either necessary to make the same type of tongue and groove faces at the cut edges as already appear on the top and bottom surfaces, or alternatively, the simple tongue and groove most easily formed such as shown in Fig. 4 and at 56 of Fig. 9 could be formed in the cut ends while the top and bottom tongues and grooves of the truss would be pre-formed to correspond to the tongue and groove of the spiral strip.

In Figs. 23 and 24 there is shown the manner of forming a bottom cap 14. The rise of the spiral of the strip being one width of strip per revolution of the spiral, the lower edge of the length of the strip will be cut on an angle whose hypotenuse 61 is equal in length to the circumference of the base plate 59. With many patterns of strip material, for convenience a separate section of such length that its diagonal will be equal in length to the base plate's circumference, may be cut from the strip and thus formed into two similar right triangle sections 60, one of which will be used with the base cap and one of which may be used with the top cap. The triangular strip section 60 thus formed will be placed with its hypotenuse 61 at the desired angle about the edge of the circular base plate 59, thus forming two V-shaped recesses on opposite sides to receive weldment or welding material 69 therein, thus forming the cap 14, to which the the strip 16 may be spirally attached. If desired, a dished base, as shown in Fig. 2, may have its edge grooved, in which case the triangular section 60 would be continuous with the base plate metal itself. In the drawings the angle of rise of the spiral and width of the strip are necessarily exaggerated for purposes of illustration, but in actual practice the angle of rise of the strip would be almost imperceptible to the eye, particularly in a large diameter sphere or cylinder. The actual width of the strip would be such in relation to the diameter of the sphere or cylinder that it could make the slight curvature necessary to follow the radius of the sphere or of the cylinder without difficulty.

Figure 14:
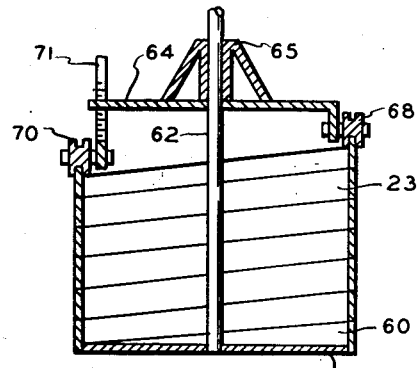
Fig. 14 shows the diameter beam of Fig. 13 constructing a cylindrical tank.
Figure 13:
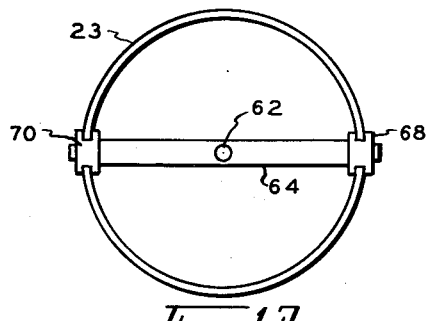
Fig. 13 is a schematic showing of a double radius or diameter beam assembly.
Figures 17, 18:
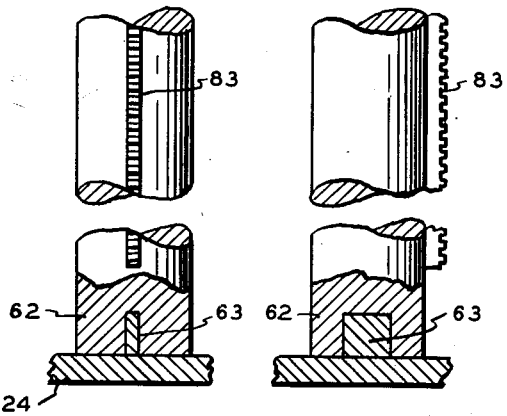
Fig. 17 is a detailed view of the bottom of the pivot bar.
Fig. 18 is a view at right angles of Fig. 17.

The details of the radius beam 11, its pivot 12, and the central upright member 13 may be varied as needed, although the form shown schematically in Figs. 1 and 3 would be ample for forming the spherical tank 10. As shown here, the radius beam 11 would be manually rotated about its pivot 12, but it is obvious that a suitable electric motor could be provided for rotating it at a suitable speed. When the joining edges of the strip are to be welded or soldered together, suitable automatic welding apparatus or soldering apparatus schematically represented at 28 would be provided on or near the end of the radius beam 11. Also, a suitable grooved wheel similar to that shown at the ends of the diameter beam in Figs. 13 and 14 would be provided for both guiding the end of the radius beam, supporting it on the spiral siding as it is formed and for forcing the tongue of a succeeding convolution into the groove of a preceding convolution.

In Figs. 13–16, inclusive, the principles of this invention are shown as applied to the manufacture or fabrication of a cylindrical tank which may have a semi-spherical top. In this case the starting strip 60 is welded to or otherwise secured about the circular base plate 24. A pivot shaft 62 is mounted on a pivot base 63 welded to the center of the base plate 24. In forming the cylindrical tank a diameter beam such as shown at 64 would be preferable in forming the cylindrical portion of the tank as far as the point 25, whereupon it would be replaced by a radius beam for forming the semi-spherical portion 26 as far as the flexibility permits, whereupon it is closed with a suitable cap 27. The diameter beam 64 shown schematically in Figs. 14 and 15 has a hub 65 about the pivot shaft 62 and carries the reel strip 66 and welding or soldering apparatus and material 67 thereon. At one end there is provided a grooved wheel 68, while at the other end another grooved wheel 70 is carried on the lower end of an adjusting strut 71, in turn, carried by this end of the diameter beam 64 so that the position of the wheel 70 may be adjusted according to the width of the spiral strip and keep the diameter beam 64 horizontal.

The horizontal diameter beam 64 with its grooved wheels 68 and 70 also has the advantage of insuring that the sides of the tank will rise perpendicularly. First of all, the grooved wheels 68 and 70 tend to firmly force the tongue of the upper convolution or coil into the groove of the lower coil. However, should there be any irregularity in the edge of the siding strip so that it will not go entirely down on the edge of the preceding coil, it is possible that some additional irregularities would be accumulated and cause the side of the tank to be no longer plumb or vertical. By providing grooved wheels of opposite ends of a diameter beam, any failure of the siding strip to contact completely with the lower coil would be compensated by a failure of the opposite wheel to similarly press that portion of the siding down, thus compensating for any irregularity and keeping the side walls plumb or vertical.

Figure 19:
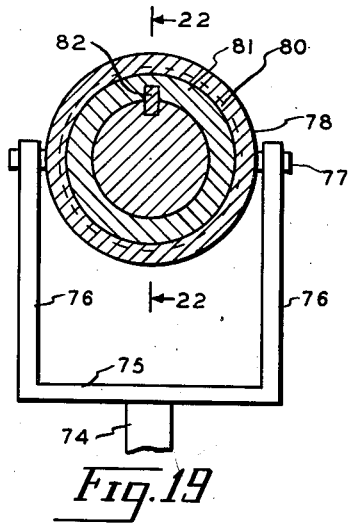
Fig. 19 shows a fixed length radius beam hub assembly.
Figure 20:
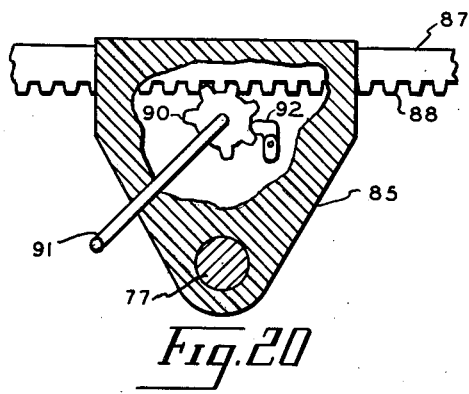
Fig. 20 shows a means for adjusting the length of an adjustable radius beam which is located at one radius fork pivot.
Figure 22:
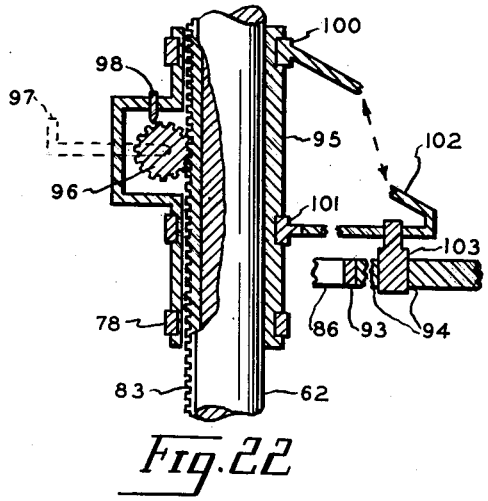
Fig. 22 is a section on line 22—22 of Fig. 19.
Figure 21:
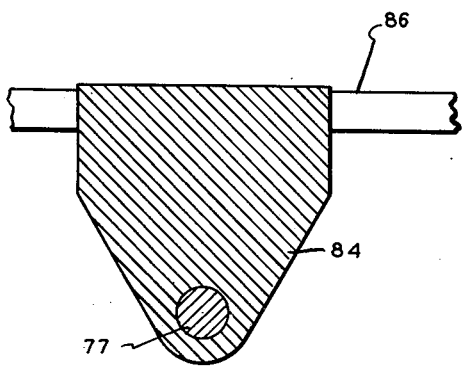
Fig. 21 shows the other radius fork pivot.

In Fig. 19 there is shown a radius beam hub assembly wherein the radius beam 74 has a fixed radius, while in Figs. 20, 21 and 22 there is shown a modification wherein the radius beam is both adjustable in length and angle and may be held at any desired length in a horizontal position for use in building a cylindrical tank and then may also be adjusted so that it may pivot for use in building the semi-spherical upper section of the tank.

Referring to Fig. 19, the radius rod 74 extends from the crossbeam 75 on forks 76 pivoted on trunnions 77. These trunnions, in turn, extend from an outer ring 78 rotatably carried in a countersunk neck 80 of a hub casting 81. The hub casting 81 is provided with a rack slot 82 through which extends the gear rack 83. This gear rack 83 extends vertically along the side of the pivot shaft 62 and by means of a suitable pinion and control crank or gear train, similar to that shown in Fig. 22, the radius beam hub may be raised along the pivot bar as needed and then held at a desired location thereon.

Fig. 22 shows a view taken on the line 22—22 of Fig. 19 but providing means for adjusting the length of the radius beam as well as for fixing the radius beam in a horizontal position for use when a cylindrical tank is being constructed. In this form, instead of pivoting the forks directly on the trunnions, sleeve members 84 and 85 are provided and pivoted on the trunnions 77. One radius beam fork 86 slides freely through the sleeve 84. The other radius fork 87 has a gear rack 88 formed along one edge and meshing with the control gear 90 mounted in the sleeve 85 and provided with an operating handle 91 and a brakepawl 92. The forks 86 and 87 extend from the radius beam crossarm 93 to which is attached a radius beam 94 in the same manner that the radius beam 74 extends from its crossarm 75. The trunnions 77 extend from the ring 78 rotatably mounted on the hub casting 95 about the pivot bar 62 in Fig. 22, and by operating the pinion gear 90 it will be apparent that the length of the radius beam 94 may be adjusted.

The hub casting 95 has mounted therein a pinion 96 in mesh with the pivot bar rack 83 and suitably controlled by a crank handle 97 or a gear train and lockable by a brakepawl 98 for lifting and lowering or holding the hub casting 95 at any desired height on the pivot bar 62. Rotatably mounted on the hub casting 95 by means of a pair of rings 100 and 101 is a bracket member 102 which is provided with a slidable sleeve 103 which may engage the radius beam 94 at a substantial distance from its pivots and thus support the radius beam 94 in a horizontal position when desired. When the radius beam 94 is to be left free to pivot about the trunnions 77 as a center, the bracket 102 is merely rotated on its rings 180° away from the radius beam 94, disengaging the sleeve 103 from the radius beam and the bracket ring 101 may be keyed or locked to the trunnion ring 78 by any suitable means, thus keeping the bracket 102 on the opposite side from, and out of the way of, the pivoting radius beam 94.

Both a spherical tank and a cylindrical tank, including a semi-spherical top section, have been illustrated in the drawings, but by proper manipulation of the radius beam length control gear 90 and the radius beam height control gear 96, tanks may be formed having various combinations of these two basic shapes. By suitable manipulation a tank may be formed having a cylindrical bottom section of one diameter, a cylindrical upper section of a smaller diameter, and connecting curve sections whose shape is a part of two reversed spheres, that is, having an inwardly curving section at the top of the larger diameter cylindrical section merging with an outwardly curved section at the bottom of the smaller diameter upper cylindrical section.

Figs. 25 and 26 show how the siding of a tank can be varied both in diameter and in shape, and indicate curvatures of siding which can be and cannot be laid down by the aforesaid mechanism. In these figures, Line AB represents a pivot bar 62. A is the upper limit through which the radius beam hub 95 can rise. B is the lower limit to which the hub 95 can be lowered. Ordinarily, the radius beam 94 lays patterns which, viewed in a vertical section, will have their center of curvature on the Line AB of the pivot bar 62. But the beam 94 can also lay down siding strips when the center of curvature is off the Line AB. This is illustrated in the two sketches in the Figures 25 and 26. The two arcs CD can be laid down, but the arcs described by the dotted lines FC and DG cannot be laid down. E represents the true center of the arcs shown. The rule of thumb is that the radius beam 94 must be at right angles to the strip of siding to be laid down. The arcs DC can be laid down by manipulating the two control pinions, even though the centers are not on the Line AB.

As thus already described, the tank may be constructed on location, but it will be apparent that in certain size tanks shop fabrication may be more practical and convenient. In shop fabrication the radius rod or the radius beam may be mounted as a part of the shop equipment and more flexibility may be provided than is possible in erection of a tank on location. Thus, in shop fabrication different size radius rods and radius beams could be interchanged during the fabrication of the particular tank, thus enabling a greater variety of shapes to be provided.

The bonding in any tank may be either temporary or permanent, according to the material of the siding and the need as to whether the finished tank should be temporary or permanent. Various types of welding could be used in fabricating a permanent tank, but in making a temporary tank soldering would preferably be used whereby the solder could be heated by a torch or other means and made fluid, allowing the siding strip to be disengaged from its spiral engagement and rewound back on the reel for reuse. Obviously the type of tongue and groove engagement between succeeding spirals will depend on the use to which the tank is to be put. In other cases, it may not be. Furthermore, the siding strips need not be only of the tongue and groove type, but may be of the lap type or any other type wherein a complementary top edge and bottom edge may be automatically interengaged as the siding strip is spirally wound thereon.

If desired, some of the least basic parts of the assembly apparatus may be left in position within the completed tank for use in cleaning the tank when necessary and for use in disassembling a temporary tank.

In Figs. 27 to 31 inclusive, there is shown a method and strip which does not need pre-formed lap or tongue and groove offsets, as above described, but wherein the building strip is formed in location from two or three individual spools, carried on the radius beam and operated simultaneously, each carrying a thin strip which is set in offset or staggered relation to the other strip or strips, thus forming a lap joint or tongue and groove joint in the finished strip for supporting the succeeding convolution.

In Fig. 27 there is shown an individual strip 104 having a plating of solder 105 shown on one surface thereof, placed thereon by dipping such surface in molten solder and allowing it to harden thereon. Such strip 104 and its solder plating 105 is particularly useful when forming a double thickness strip 106, as shown in Figs. 28 and 29, particularly intended to be temporarily sweated together for later disassembly, in which case subsequent heating will unsweat the strip and allow the individual strips to be separated and rolled on separate spools.

In Figs. 30 and 31, three individual strips 104 are joined together, as by spot welding in location, to form a tongue and groove top and bottom edge cooperating with preceding and succeeding convolutions. Each strip is fed simultaneously from a separate spool, all carried on the same radius beam to the location, and then spot welded together to form the completed strip 107. In either the two strip or three strip thick finished shell, the inner strip will be fed on a smaller radius than the next outer strip, so that when soldered or welded together, the finished strip will thus have a pre-set curvature tending to remain in such curvature, as compared to the previously described single thickness strip of greater thickness, where there will necessarily be an inherent tendency to straighten out. With individual thinner strips for making up the multiple thickness strip, it is easier to roll the thin strips on the spools, and, when needed, the finished strip can be of a smaller radius than with an initially thick strip. The truss of Figs. 9 and 10 may likewise be similarly formed of two or three individual thin plates soldered or welded together in location.

In Fig. 32, the same idea is applied to making a base or roof cap or plate. Two separate plates or caps 110 and 108 of suitable size are cut out, as by a gas torch, controlled by a template, to the right size and shape, with an offset right angle 109 having its vertical of the height of an individual strip 104, so that the end of a full height strip 104 may be secured thereagainst in starting the construction, eliminating the need for a bevelled starting strip 60, as in Fig. 24. After the plates 110 and 108 are cut and formed, they are dished together and soldered or welded together as desired. Obviously, the same method may be used for making a three thickness plate or cap, for cooperation with the three thickness building strip 107. Likewise, such a three thickness plate may be used with the heavier tongue and groove strip or strake 16 previously set forth.

In Fig. 33, a tongue and groove strip or strake 111 is shown as being provided with an outwardly projecting track 112 on each outer surface thereof, which track can also be provided on each of the other forms of strip herein disclosed. Such track 112 is useful both in providing means for the welding head to grip it securely in mash welding a succeeding convolution, and also in cooperating with maintenance equipment, such as spray painting equipment, etc.

While the preferred form of this invention has been shown and described, it will be understood that this invention is not restricted to the particular details of construction and arrangement hereinbefore set forth, but that changes in such details and construction may be made within the scope of what is hereinafter claimed without departing from the spirit of this invention.

Having thus set forth and disclosed the nature of this invention, what is claimed is:

1. The method of constructing a spherical tank comprising cutting at least two substantially circular plates of slightly different size to form a base, dishing said plates with the larger having its concave face in confronting relation with the convex face of the next largest, then providing on the peripheries of each plate a right angled offset and spacing said offsets a slight circumferential distance from each other to provide a shoulder, then securing said plates together with their peripheries concentric, securing to each offset in end to end relation one end of a similar number of strips of equal width, then securing said strips to said peripheries and to each other in continuous spiral convolutions and securing said strips to each other in lateral offset relation to provide a shoulder on one edge and a matching shoulder on the other, and thereafter providing a top cap consisting of similarly dished and cut plates provided with corresponding offsets and peripheries, and securing said cap to said strips in edge to edge relation and with the ends of said strips in abutting relation one each with said offsets.

2. The method of constructing a spherical tank comprising cutting three substantially circular plates of increasingly larger size to form a base, then dishing said plates with the larger having its concave face in confronting relation with the convex face of the smaller and that one having its concave face in confronting relation with the convex face of the next larger to form a groove between the peripheries of the outer and inner plates, then providing on the periphery of each a right angled offset, then spacing said offsets a slight circumferential distance from each other to provide a groove therebetween and securing said plates with peripheries concentric, then securing to each offset in end to end relation the end of three strips of equal width, securing said strips to said plates in edge to edge relation one to each plate, securing said strips to each other in lateral offset relation to provide a groove on one edge and a tongue on the other and then securing said strips in continuous spiral convolutions with tongue in groove edge to edge relation, and thereafter providing a top cap having similarly dished plates provided with corresponding offsets and peripheries, and securing said cap to said strips in the edge to edge relation and with the ends of said strips in abutting relation one each with said offsets.

References Cited in the file of this patent

UNITED STATES PATENTS

| Number | Name | Date |
|---|---|---|
| 747,876 | Fisher | Dec. 22, 1903 |
| 788,970 | Waterman | May 2, 1905 |
| 809,561 | Greenfield | Jan. 9, 1906 |
| 1,324,005 | Bucknam | Dec. 2, 1919 |
| 1,539,383 | Bienenstok | May 26, 1925 |
| 1,872,810 | Raymond | Aug. 23, 1932 |
| 1,875,483 | Naylor | Sept. 6, 1932 |
| 2,072,284 | Voorhees | Mar. 2, 1937 |
| 2,081,691 | Zapf | May 25, 1937 |
| 2,162,731 | Lyon | June 20, 1939 |
| 2,221,133 | Gladville | Nov. 12, 1940 |
| 2,239,368 | Lyon | Apr. 22, 1941 |
| 2,370,780 | Crom | Mar. 6, 1945 |
| 2,371,107 | Mapes | Mar. 6, 1945 |
| 2,373,038 | Lindsay | Apr. 3, 1945 |
| 2,474,149 | Hume | June 21, 1949 |
| 2,515,097 | Schryber | July 11, 1950 |
| 2,600,630 | Fergusson | June 17, 1952 |
| 2,623,643 | Seamans | Dec. 30, 1952 |